3 Sheets—Sheet 1.
F. BRUNBAUER.
INJECTOR.
No. 11,456. Reissued Dec. 11, 1894.
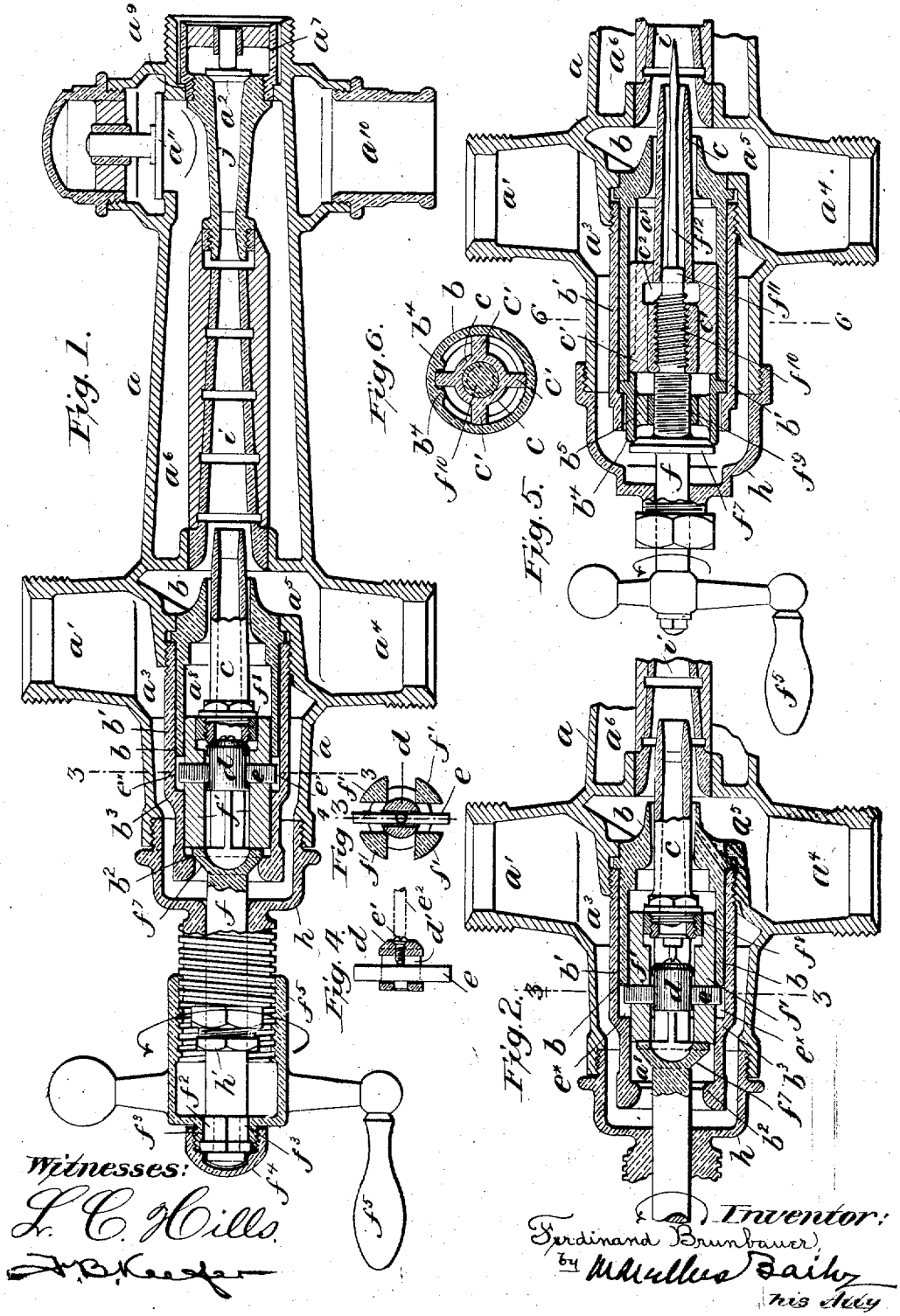
Witnesses:
L. C. Hills
F. B. Keeler
Inventor:
Ferdinand Brunbauer,
by M. Wallace Bailey
his Atty 3 Sheets—Sheet 2.
F. BRUNBAUER.
INJECTOR.
No. 11,456. Reissued Dec. 11, 1894.
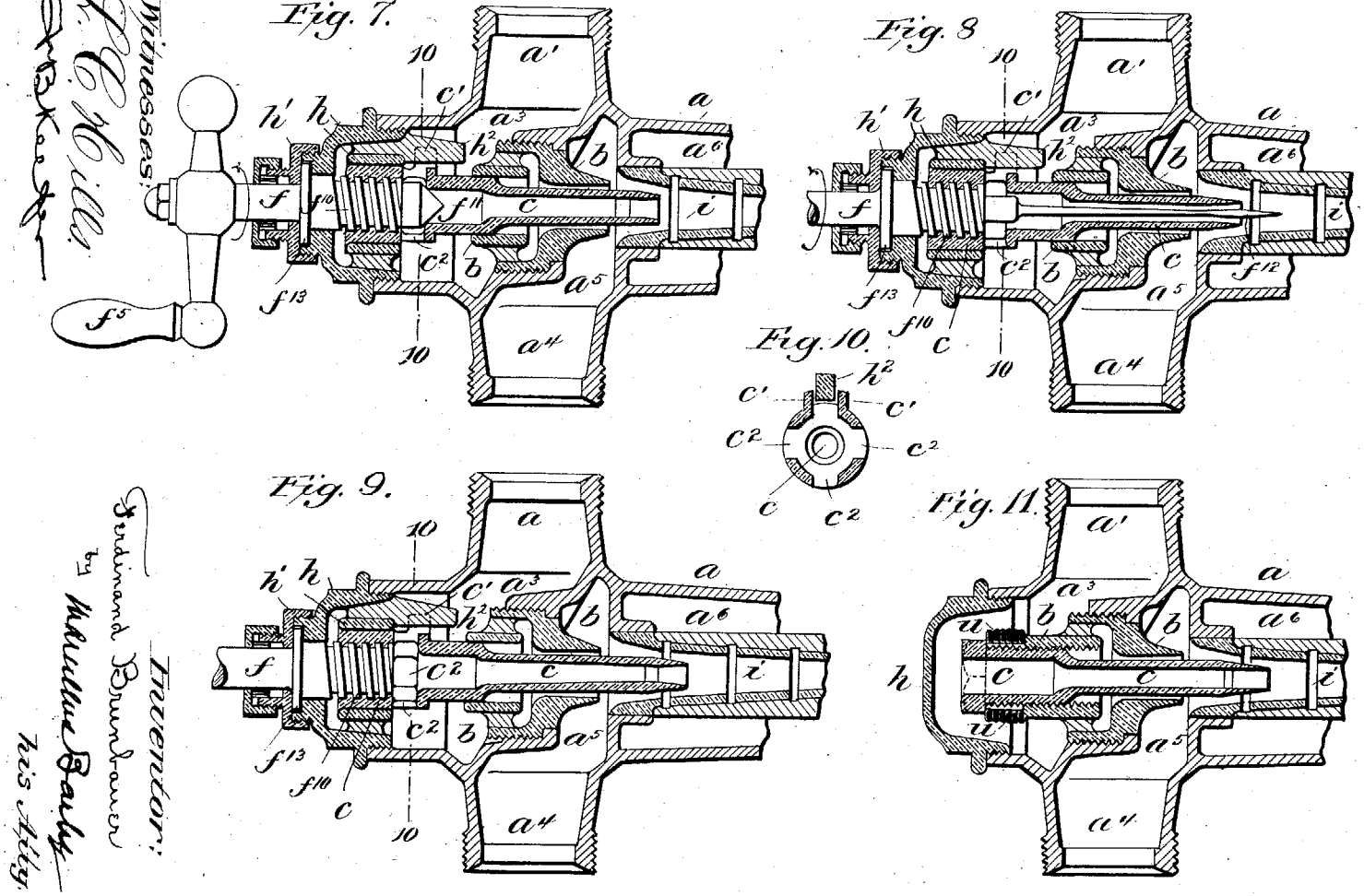
Witnesses:
L. C. Hills.
A. B. Kee Jr.
Inventor:
Ferdinand Brunbauer
by Marcellus Bailey
his Atty.

3 Sheets—Sheet 3.
F. BRUNBAUER.
INJECTOR.
No. 11,456. Reissued Dec. 11, 1894.
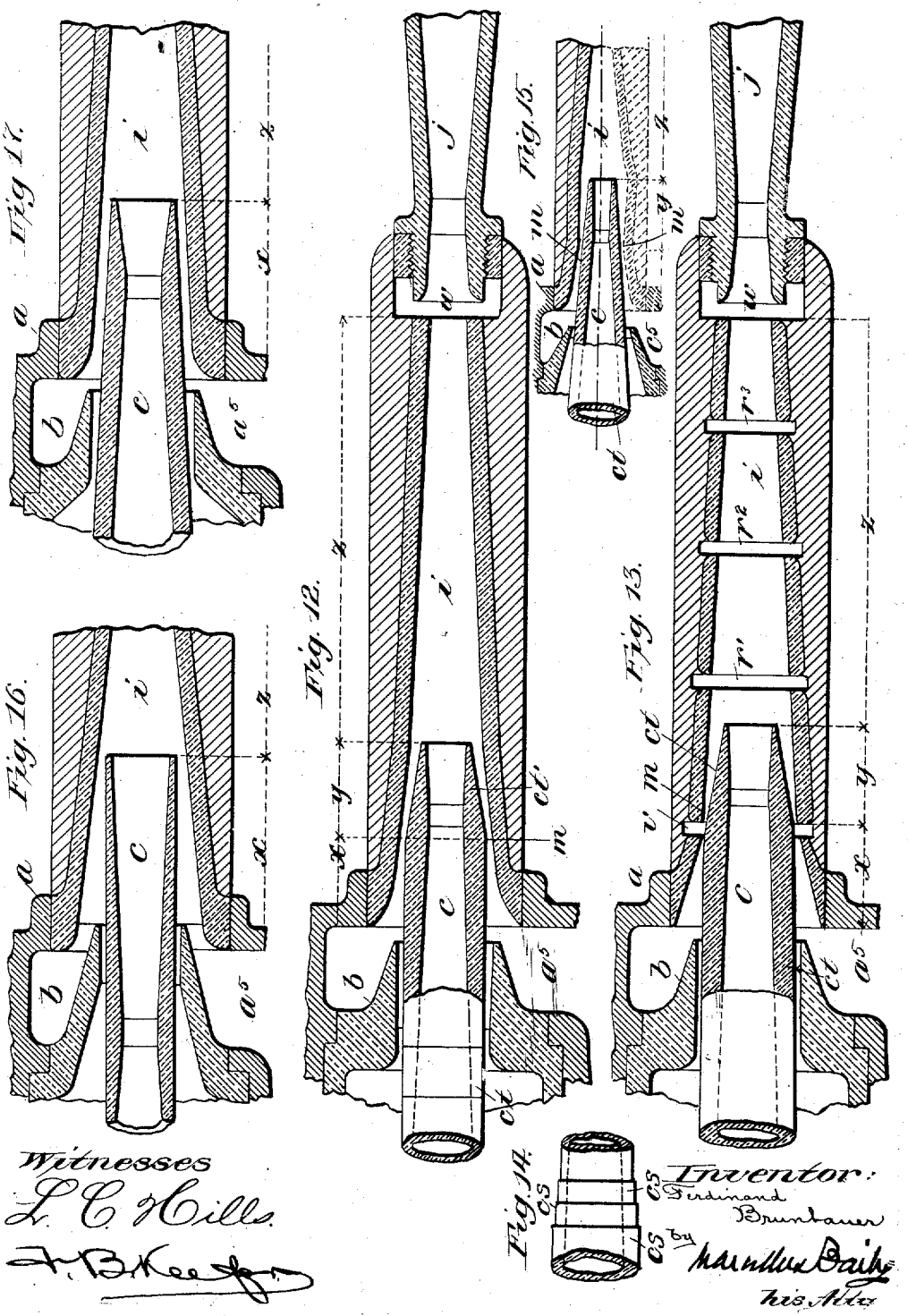

UNITED STATES PATENT OFFICE.

FERDINAND BRUNBAUER, OF VIENNA, AUSTRIA-HUNGARY.

INJECTOR.

SPECIFICATION forming part of Reissued Letters Patent No. 11,456, dated December 11, 1894.

Original No. 500,752, dated July 4, 1893. Application for reissue filed November 16, 1894. Serial No. 529,062.

*To all whom it may concern:*

Be it known that I, FERDINAND BRUNBAUER, a subject of the Emperor of Austria-Hungary, residing at Vienna, in the Empire of Austria-Hungary, have invented certain new and useful Improvements in Injectors, of which the following is a specification.

My invention relates to injectors in which the water, by successive impulses of two or more steam jets, is forced into the boiler. Such injectors generally are capable of automatic action under different steam pressures and varying conditions of water supply; and, in case their combining tube or tubes are provided with sufficiently wide outlet passages, they, like any other injector, can be "restarting," that is to say they can reform the jet of water if the latter, from any cause, should be interrupted or broken.

It is one object of my invention, in a simple and economical way to so construct an injector of the kind referred to that its capacity—viz: the delivery of water—can be readily adjusted to the varying working conditions of the steam boiler with which it may be used.

For the purpose of regulating the quantity of water delivered, double jet or double tube injectors hitherto in use have been provided with a special water regulator in the shape of a valve or cock arranged in the water inlet port or water chamber of the injector or in the suction pipe of the same, and operated independently of the steam inlet mechanism of the injector. Under this old arrangement the water valve is kept quite open when the maximum quantity of water is to be delivered; and in order to feed smaller quantities the water delivery is throttled by the valve. On the other hand the volume of steam issuing from the different steam nozzles or passages remains constant. Consequently it is evident that reduction of water delivery necessarily will result in a considerable increase in temperature of the water fed into the boiler. On such of these injectors as possess an overflow communicating with the atmosphere, the limit of delivery is attained when steam and water begin to escape from the overflow; and as the highest admissible delivery temperature may be fixed at about 200° Fahrenheit, increase of the temperature beyond this point due to the throttling of the water supply as above stated, will cause the rupture or interruption of the water jet. Furthermore the nozzles and overflow chambers of such injectors, when the latter are often used to feed minimum or reduced delivery quantities of water, are subjected to very considerable incrustation owing to the increased separation of the limy parts of the feed water due to the excessively high temperature. It is my purpose also to avoid these disadvantages, and to dispense entirely with the water throttle valve usually employed on ordinary double jet or double tube injectors. These injectors usually contain a lifting and a forcing set of nozzles, these two sets being placed within separate but connecting barrels or tubes, either side by side, or one above the other, or the two sets of nozzles may be arranged in the same axial line within a common barrel, which arrangement I prefer. In this latter type of double jet or double tube injectors, as is well known, there are usually an annular lifting steam nozzle, a lifting combining tube, a central steam forcing nozzle, a forcing combining tube, beyond the lifting combining tube, and a forcing delivery tube beyond the forcing combining tube.

Under my invention I interpose between the lifting combining tube and the forcing combining tube a "lifting delivery" tube, which bears to the lifting combining tube a relation analogous to that in which the forcing delivery tube stands to the forcing combining tube; and in connection with this arrangement I provide for varying the steam and water passages in accordance with the supply of water demanded—the means employed by me being the forcing steam nozzle which is made movable for the purpose. These, together with other features of my invention and their resultant advantages will be set out in the detailed description of the apparatus which I shall now proceed to give in connection with the accompanying drawings forming part of this specification, and in which—

Figure 1 is a longitudinal axial section of an injector embodying my improvements in its position of rest. Fig. 2 is a like section of a portion of the same with the parts in the position they occupy when the injector is at work. Fig. 3 is a section of the supplemental valve which controls admission of steam to the forcing steam nozzle—the line of section being on 3—3 Fig. 1 or 2. Fig. 4 is a sectional elevation on line 4—4 of Fig. 3. Fig. 5 is a longitudinal axial section of a modified form of the injector. Fig. 6 is a transverse section (on line 6—6 Fig. 5) of the supplemental steam chamber and its contained parts. Figs. 7, 8, 9 and 11 are longitudinal axial sections of other modified forms. Fig. 10 is a section of the interior parts of the injector on line 10—10 Fig. 7 or 9. In Figs. 5, 7 and 8 the injector parts are represented in the position they occupy when the injector is at rest. In Figs. 9 and 11 they are represented in the position they assume when the injector is in action. The remaining figures, 12 to 17 inclusive, are sectional details on exaggerated scale, intended to better illustrate and explain my invention. They will be hereinafter more particularly referred to.

Referring now to Figs. 1 to 4 inclusive—the casing $a$ of the injector has a steam inlet $a'$ and a water inlet $a^4$, and its forward end (communicating with the water space of the boiler as usual) is provided with a check valve $a^3$ kept closed by boiler pressure. The diaphragm between the steam chamber $a^3$ and the water chamber $a^5$ is provided with an opening in which is inserted the lifting steam tube $b$, which latter is there held rigidly in place by the guide box $b'$. The latter fits around the enlarged tubular rear portion of said tube $b$ and in connection with it forms an internal guide surface for the wings $f'$ of a stem $f$. The stem passes rearwardly through a stuffing box $h'$ of the cap $h$ of the casing $a$, and on its projecting end is placed a two part collar $f^3$ which swivels on the stem and is rigidly connected by a nut $f^4$ to the handle $f^5$. The handle has a tubular internally screw-threaded hub which screws as a nut on the externally screw-threaded cylindrical shank of the casing-cap. By turning the handle it will be caused to move back and forth on the cap, thus carrying with it the stem $f$. The stem partakes only of the longitudinal movement of the handle, because the latter is swiveled to it by the collar $f^3$, and the stuffing box $h'$ through which the stem passes exercises upon it sufficient friction to restrain it from rotary movement. Upon an enlarged portion of stem $f$ and within the guide box $b'$ is a valve $f^7$ adapted to co-operate with a valve seat $b^2$ formed at the rear end of the box. This box it may be remarked forms a steam chamber $a^8$ which is supplemental to the main steam chamber $a^3$, and contains the steam inlets to both the lifting steam tube and the forcing steam nozzle; and admission of steam to it from the main steam chamber is controlled by the inlet valve $f^7$. Forward from the valve $f$ and rigidly connected thereto, extend the wings $f'$ which encircle and furnish a bearing for a sliding valve $d$ that closes the rear end of the forcing steam nozzle $c$. The steam nozzle itself is fastened to the ring $f^8$ rigidly connected to the front ends of the wings $f'$, and extends forward through the lifting steam tube $b$ forming therewith the annular lifting steam nozzle. Thus the forcing steam nozzle $c$ is lengthwise movable with the stem $f$, and in its movement is guided by the stem.

In a slot $d'$ in the supplemental valve $d$ is secured by a screw $e'$ or other suitable means a cross piece $e$ the ends of which project through opposite spaces between the wings $f'$ into free spaces or recesses $e^\times$ of a certain length in the inner wall of the supplemental steam chamber. The valve is capable of lengthwise movement to the extent permitted by these recesses. In some cases the valve $d$ may have on its front end a spindle $e^2$ as indicated in Fig. 4 by dotted lines, which spindle will extend into the bore of the tube $c$ for the purpose of varying the steam passage therein. By a slight turn of the handle $f^5$ in the direction of the arrow, in Fig. 1, stem $f$ will be advanced, opening valve $f^7$ and thus allowing the boiler steam to flow from main steam chamber $a^3$ into the supplemental steam chamber $a^8$. The resultant steam pressure therein will immediately force and hold valve $d$ to its seat, thus closing the forcing steam nozzle $c$; and consequently the steam can pass only through the annular lifting steam nozzle, thus furnishing the "~~lifting~~ steam jet" which is generally used to lift the water. By continued movement in the same direction of the stem $f$, the cross piece $e$ of the valve $d$ will finally bring up against the front end of the recesses $e^\times$, and thus the valve will be restrained from further movement, while the tube $c$ still moves forward with the stem $f$, and will be opened to the admission of steam which passing through the tube $c$ furnishes the "forcing steam jet."

The injector casing $a$ is formed with an overflow chamber $a^6$, and contains the tube $i$, (answering in some respects to the usual "combining tube,") the forcing delivery tube $j$ and the check valve box $a^7$. The parts $i$, $j$ and $a^7$, are rigidly connected together. They are inserted as one piece into the casing and are held therein in proper position by suitable means, as for example by coupling the usual delivery pipe (not shown) with the injector. When this is done the tail piece of the pipe will bear against and press the check valve box $a^7$ upon the seat $a^9$ provided for it in the casing.

The position which the steam and water tubes occupy relatively to one another is represented in the figures already described. These parts however, for the purpose of further explanation, are represented on exaggerated scale in Figs. 12 to 15, by reference to which I will now proceed to describe the particular construction and arrangement of these tubes by which as I believe the largest possible range of delivery is permitted and the best results in other respects are obtained.

The greatest range of delivery can be attained, so far as I am now informed, by varying the sectional area of the most constricted part of the steam tube, and combining tube intended for the first or lifting impulse on the water. The lifting steam passage is the annular space between the lifting steam tube *b* and the forcing steam nozzle *c*, and the variation in this passage can best be effected by making the central forcing steam tube *c* lengthwise movable as hereinbefore described, and by varying the outside diameter of that portion of it intended to control said annular lifting steam passage. For this purpose the exterior of the forcing steam nozzle *c* in Fig. 12, has a short, slow or gradual taper *c t* increasing in diameter from front to rear. Consequently by moving the nozzle *c* forward, the annular lifting steam jet will be proportionately reduced. In Fig. 13, this slow taper *c t* covers a greater length of the outside of the tube *c*; while in Fig. 14 instead of this continuous taper, I provide a number of steps *c s* which operate on the same plan and in the same way as the taper.

Before describing the way in which the variation of the lifting combining section of the tube *i* may be effected, I will first refer to a special arrangement of the water passage in this tube, which, independently of the means for varying the delivery, forms one part of my invention. In order to better define this feature of my invention as well as to distinguish it from what is found in prior apparatus of the same general kind, I have represented in Figs. 16 and 17 two old constructions which are part of the art prior to my invention. These figures show only the relative arrangement of the steam and water tubes and omit the overflow spaces in the combining tube.

Fig. 16 shows an arrangement similar to that found in my two United States Letters Patents No. 362,247 of May 3, 1887, and No. 369,097 of August 30, 1887. In it, the forcing steam nozzle *c* is lengthwise movable in the lifting steam tube *b* and an annular lifting steam space of constant dimensions is formed between the tube *b* and the cylindrical exterior of the forcing steam nozzle *c*. The steam issuing from both nozzles and acting on the water drawn from the water chamber $a^5$ gives two distinct and successive impulses on the water, by which the velocity of the water in the combining tube *i* is continually accelerated, until sufficient to overcome boiler pressure.

Fig. 17 represents a later arrangement similar to that shown in United States Patent to Kneass, No. 376,315, of January 10, 1888. In this construction both tubes *b* and *c* are rigidly connected together to form an annular lifting steam passage of constant section and are fixed into the casing *a* of the injector; and the forcing steam nozzle *c* has for its full length a slow external taper converging toward the forward end of the nozzle. In both instances shown in Figs. 16 and 17, the forcing steam nozzle *c* projects into the tapering combining tube *i* and forms with this tube through the length *x* the "lifting combining tube" or the annular combining tube for the lifting steam jet, and through the length *z* the "forcing combining tube," that is to say the combining tube for the forcing steam jet. The water lifted into the water chamber $a^5$ enters the lifting combining tube *x* and is continually accelerated in its course toward the front end of the forcing steam nozzle *c* by the continuously decreasing annular section of the lifting combining passage. After the water passes this point having already considerable velocity the forcing steam jet which now acts upon it forces it through the also successively decreasing sections of the converging forcing combining tube *z*, imparting to it the necessary velocity to enter the delivery tube (not shown in Figs. 16 and 17 but similar to the delivery tube *j* of Figs. 1 and 12) by the diverging bore of which the water velocity is slowly and continually converted into water pressure sufficient to permit the water to press back the check valve and enter the boiler. In these arrangements there is thus a constant and continuous acceleration of water velocity in the combining tube *i*. This combining tube is in effect divided into two sections termed respectively the "lifting combining tube" and the "forcing combining tube," and beyond the latter is the delivery tube *j* which may be termed the "forcing delivery tube." Now my invention in this direction may be stated to consist in providing for the lifting steam tube and its lifting combining tube a delivery tube of annular section intended to operate in connection with the lifting combining tube and bearing to it a relation analogous to that which the forcing delivery tube *j* bears to the forcing combining tube *i*. In other words, instead of having a combining tube composed, as in Figs. 16 and 17, of the lifting combining tube *x* and the forcing combining tube *z*, I provide a combining tube which is composed of a lifting combining tube *x*, a forcing combining tube *z*, and a "lifting delivery tube" *y*, which is interposed between the two, and through which the water from the lifting combining tube must pass before it can reach the forcing combining tube. The lifting delivery tube *y* is of annular section, as seen in Figs. 12, 13, and 15, and, like the lifting combining tube *x*, is formed by the inside of the combining tube *i* and the outside of the forcing steam nozzle *c*. As regards the annular sections of said lifting delivery tube *y* they progressively increase from the rear end of said tube, which is of about the same section as the forward end of the lifting combining tube *x*, up to the front end of the forcing steam nozzle *c* where it terminates. Under this arrangement the water which passes out through the small passage *m* at the end of the lifting combining tube *x* with considerable velocity enters the lifting delivery tube *y* in passing through the successively increasing annular sections of which it loses in part this velocity which is slowly transformed into pressure the result being that the forcing steam jet rising from the nozzle $c$ will be surrounded by an annular jet of water of reduced velocity and under pressure—conditions most favorable for the condensation of the forcing steam jet. As I have before stated, this provision of a lifting delivery tube $y$, is a feature of my invention which may be used, whether the variable delivery adjustment be employed or not; but I prefer to use the two in conjunction. The lifting delivery passage is annular and is formed by the length $y$ of the combining tube $i$ and that portion of the forcing steam nozzle $c$ which passes through the length $y$; and the annular section of the same increases continually from the rear $m$ to the front. The manner in which this condition may be fulfilled is indicated in Figs. 12, 13, and 15.

In Fig. 12 the forcing steam nozzle $c$, in the main cylindrical externally, is provided for a certain length of its forward end with a quick external taper $c\,t'$ which forms with the converging and slowly tapered bore of the length $y$ of the combining tube $i$ the lifting delivery passage.

In Fig. 13, practically the same conditions exist so far as this passage is concerned; and in cases where two converging tapers form the lifting delivery tube, it may be taken as a rule that through the length $y$, the outside taper of the forward end of the forcing steam nozzle $c$ must always be a quicker one than the inside taper of the combining tube $i$.

Fig. 15 shows two different forms of the combining tube $i$ in connection with a forcing steam nozzle having a continuous external taper $c\,t$. The combining tube $i$ shown in full lines, has a quick taper through its length $x$; and through its length $y$ has a very slight and almost inappreciable taper—indeed it may be cylindrical. The combining tube shown in dotted lines is made as a converging cone through its length $y$. In each case however an annular lifting delivery passage fulfilling the conditions hereinbefore expressed is obtained. It will be understood that in the latter case, that is where a diverging cone $y$ is employed, the forcing steam nozzle may have a cylindrical exterior or may even be made as a diverging tube also. Other variations and changes in form also can be made in these parts without departure from my invention.

In Figs. 12 and 13, the usual overflow $w$ is provided just in rear of the forcing delivery tube $j$. Inasmuch as the set of tubes—viz., the lifting steam tube $b$, the lifting combining tube $x$ and the lifting delivery tube $y$, of annular section throughout—which give the first impulse, operate as an injector, I may also provide just in rear of the lifting delivery tube $y$, an overflow $v$ (Fig. 13) analogous to the overflow $w$ in rear of the forcing delivery tube $j$.

If it be intended that the injector should be a restarting one, and therefore capable of reforming the water supply column if the latter from any cause should be broken, the forcing combining tube $z$, may, as shown in Fig. 13, be provided with a suitable number of overflow openings $r'$, $r^2$, $r^3$, located between the forward end of the forcing steam nozzle $c$ and the usual overflow space $w$, and where at a high steam pressure it is desired to produce a high vacuum in the water chamber $a^5$, I can provide a supplementary overflow passage in the lifting combining tube $x$, back of overflow space $v$, and also if necessary still another supplementary overflow passage in the lifting delivery tube $y$, just forward of the space $v$ and near the passage $m$.

In cases where it is intended to deliver the water to the boiler at a temperature above the atmospheric boiling point, all or a great part of the overflow spaces—generally most of those situated in the forcing combining tube $z$ (including the usual overflow space $w$)—may be omitted or made ineffective, after the starting of the injector.

Instead of overflow spaces of the form shown, they may consist each of a series of holes; or the combining tube $i$ may consist of a number of separate tubes, set at such distance from one another as to have the overflow spaces between them.

I now return to the description of the manner of varying the lifting combining passage. This variation affects and is shared also by the lifting delivery passage.

As hereinbefore stated the delivery quantity depends upon the size of the narrowest or most constricted portion of these passages. This narrowest point is at $m$, and its variation in size, like the variation of the lifting steam jet as already explained, is effected by the endwise movable forcing steam nozzle $c$. In Fig. 12 the parts are shown in the position which they occupy for maximum delivery. By moving forward the forcing steam nozzle $c$, the lifting steam passage is slowly reduced or constricted by the taper $c\,t$, and the passage $m$ also is narrowed by the advance of the nozzle $c$ into the converging bore of the combining tube $i$.

By a suitable arrangement and proportioning of the acting tapers, the two passages can be varied not only simultaneously but at the same rate; as will be understood without further explanation.

In the arrangement shown in Fig. 12, it will be seen that in varying the delivery the lifting combining tube $x$ and the forcing combining tube $z$ vary in length, while the length of the lifting delivery tube $y$ remains constant.

In Fig. 13 the movable forcing steam nozzle $c$ is in the forward position for minimum delivery. By moving back the nozzle $c$ the delivery will be increased—this rearward motion enlarging the passage $m$ and the most constricted part of the lifting steam way. In Fig. 15 the same effect is produced in a similar way. In these two examples of my invention in varying the delivery, the lifting delivery tube and forcing combining tube vary in length, while the length of the lifting combining tube remains constant.

The advantages which accrue from the use of the annular lifting delivery tube are manifold and important. The range of the automatic action of the injector under variable steam pressure and water supply conditions is considerably increased. The injector is adapted to feed water of higher temperature, inasmuch as the condensation of the forcing steam jet is effected under the water pressure produced by the action of the lifting delivery tube. For the same reason and without regard to the reduction of delivery effected by a movable forcing steam nozzle, if such be used, the range of the variation of delivery is a more extensive one. Inasmuch as the condensation of the forcing steam jet is effected under a lower water velocity and a certain pressure, this condensation takes place more rapidly and effectively than it would if the water should reach the steam under great velocity but without pressure. This feature of quick steam condensation is of particular importance in that it materially serves to enhance the restarting capacity of the injector, as will be understood by reference to Fig. 13. In that figure the overflow space $r'$ is quite near the forward end of the forcing steam nozzle $c$ and in the wider portion of the bore of the combining tube. This is made practicable by reason of the employment of the lifting delivery tube $y$ which causes the quick condensation of the forcing steam jet and consequently permits the overflow space $r'$ to be placed nearer to the front end of the nozzle $c$ than it could be were the lifting delivery tube omitted; the effect of which omission would be to require more of the length of the combining tube for effecting condensation, due to the high velocity of the water and the absence of water pressure. By thus locating the overflow space at the larger inside diameter of the combining tube the vacuum produced by the full steam injection is increased, and consequently the restarting capacity of the injector is enhanced.

Having described the arrangement and construction of the different tubes and the office which each one of them fills, and having also explained the manner in which the variation of delivery is effected, I now proceed to a description of the improved devices represented in the other figures of the drawings for controlling the successive or simultaneous steam admission to the steam tube. The set of tubes shown in these figures is identical with that represented in Fig. 13.

As will be seen in Fig. 1—where at the starting of the injector there is successive steam admission first to the lifting steam tube and then to the forcing steam nozzle—the forcing steam nozzle $c$ for maximum delivery is withdrawn to a certain extent, thereby furnishing in the lifting combining tube an enlarged water passage whereby, especially at a high steam pressure, a considerable vacuum in the water chamber $a^5$ is produced. It may happen that—owing to a variation in length of the lifting delivery tube $y$ due to the causes mentioned in connection with Fig. 13—the lifting delivery tube $y$ will for the time being entirely disappear if in starting the injector the nozzle $c$ be far enough back to bring its taper $c\,t'$ into the lifting combining tube $x$; but afterward in advancing the tube for the purpose of opening the steam forcing nozzle (till now closed by the valve $d$ as already explained) the lifting delivery tube $y$ is re-established as indicated in Fig. 2.

The injector shown in Figs. 5 and 6 differs only in the steam controlling devices, the other parts being in substance the same as the injector shown in Fig. 1. The steam controlling parts are shown in the position in which steam is cut off from both steam tubes. The spindle $f$ has a rearward movement to open the valve $f^7$ which controls admission of steam to the supplemental steam chamber $a^8$. Steam is admitted successively to the two steam tubes; and the tube or nozzle $c$, while actuated by the stem $f$, is so connected to it as to move forward when the latter moves back and vice versa. Forward of the valve $f^7$, the stem is formed as a differential screw having a shorter pitched thread $f^9$ and a longer pitched thread $f^{10}$ both running in the same direction. In this instance they are right handed. In front of this point the stem terminates in a cylindrical plug $f^{11}$ which may if desired have a spindle prolongation $f^{12}$. The forcing steam nozzle $c$ extends axially through the lifting steam tube $b$, and is centrally guided in its to and fro movement in the supplemental steam chamber by its wings $c'$; and to prevent nozzle $c$ from rotating one of its wings extends between two guide ribs $b^4$ (Fig. 6) projecting from the inner wall of the supplemental steam chamber. At their rear the wings $f'$ are joined by a hub which is internally screw-threaded and engages, as a nut, the longer pitched screw thread $f^{10}$ of the stem $f$—steam openings $c^2$ being left between the wings in front of this hub or nut to allow steam to have access to the mouth of the nozzle $c$. When the injector is in position of rest this mouth is entered and closed by the plug $f^{11}$ as shown. The valve seat bore $f^2$ has a hub secured to the rim of the bore, by arms between which are intervals $b^5$ for the passage of the entering steam; and this hub is internally screw-threaded, forming in effect a fixed nut which engages the quicker pitched thread $f^9$ of the stem $f$.

The operation is as follows: To open the injector, the handle $f^5$ is revolved in the direction of the arrow thereon. By giving it about one turn, the stem $f$ will be drawn back enough to lift the valve $f^7$ from its seat thus admitting steam from the main steam chamber into the supplemental steam chamber $a^8$, whence it at once passes to the lifting steam tube $b$. By this movement the steam tube $c$ has been advanced a distance equal to the difference between its coarse pitched thread $f^{10}$, and the fine pitched thread $f^9$, but owing to the fact that the plug $f^{11}$ still closes or constricts the mouth of the forcing steam nozzle $c$, the steam will discharge mainly or entirely through the lifting steam tube $b$, and thus the water will be lifted into the water chamber $a^5$. Then by giving one or more additional turns of the handle in the same direction, the forcing steam nozzle will be advanced far enough to allow free passage of steam through it also, thus establishing the injector in action. The remaining turns of the handle in the same direction are used for the purpose of varying the delivery in the manner hereinbefore described. The spindle prolongation $f^{12}$ may be dispensed with if desired. So also, if it is desired to operate both tubes $b$ and $c$ simultaneously the plug $f^{11}$ (Fig. 5) or the valve $d$ (Fig. 1) may be omitted. The injector shown in Fig. 7 is one in which the steam passage is always open. The injector is represented in its position of rest with the endwise movable forcing steam nozzle $c$ closed. The nozzle is axially arranged with respect to the lifting steam tube $b$ through which it passes. It is supported in a suitable guide sleeve or hub with which tube $b$ at its rear is provided, and also at a point still farther back by a tubular bearing or hub, connected to the interior of cap $h$ in which fits and can slide a nut like prolongation of the nozzle $c$ that is internally screw-threaded to engage a like thread $f^{10}$ on stem $f$. Between this nut-like part and the body of the nozzle are ports $c^2$ through which steam from the steam chamber $a^3$ can enter the nozzle, the mouth of which forms a valve seat for a conical valve face $f^{11}$ on the front end of the stem $f$. To prevent the nozzle $c$ from rotating it has two wings $c'$ between which extends the longitudinal rib $h^2$ fast to cap $h$. The stem which passes out to the rear through cap $h$, has a handle $f^5$, and is provided with an annular flange or collar $f^{13}$ seated in the cap and held in position by the stuffing box $h'$.

In view of what has hereinbefore been said the operation of this injector will be understood without further explanation.

Figs. 8 and 9 show constructions resembling Fig. 7 so closely as to require no description further than to say that in Fig. 8 the valve device $f^{11}$ which closes the mouth of the forcing steam nozzle $c$ is a cylindrical plug like that shown in Fig. 5 instead of a conical valve as in Fig. 7 and is provided with a spindle prolongation $f^{12}$; while in Fig. 9 the stem $f$ carries no valve at all for closing the forcing steam nozzle, and is used only for the purpose of adjusting this nozzle—the arrangement being such that steam whenever it enters the injector will issue simultaneously from both tubes $b$ and $c$. In this figure the lifting delivery passage exists when the parts are in the position of rest (the position indicated in the drawings) and the only purpose of making the nozzle $c$ adjustable is to vary the delivery.

Fig. 11 represents an injector having steam tubes $b$ and $c$ which are non-adjustable with reference to each other while the injector is in action. Steam entering the injector issues simultaneously through both tubes. The forcing steam tube or nozzle $c$ is supported in place by being screwed into a suitable central hub like tubular bearing with which the tube $b$ is provided at its rear end. The nozzle $c$ can be adjusted with reference to the other parts, when the injector is not in action by taking off the cap $h$ of the case $a$, and then taking hold of the head of the nozzle and turning it in one direction or the other so as to advance or retract it as desired. Washers $u$ may be interposed between the head of the nozzle and the opposed end of the hub in which the nozzle takes its bearing; but they are not indispensable and may be omitted. It is evident from the last instance that it is not a necessity that the endwise movable nozzle $c$ should be prevented from axial rotation; and manifestly the nozzle $c$ of the injector in Fig. 11 could be rigidly attached to a stem extending out through a stuffing box in the cap $h$ and provided with an operating handle, whereby the nozzle could be readily adjusted while the injector was in action; also the arrangement of the valves for controlling steam admission to the steam tubes manifestly can be widely varied without departure from my invention.

If it be desirable to entirely shut off at any time the water passage in the direction of overflow space $a^6$ the combining tube $i$ and the forcing steam nozzle $c$ may be so arranged and proportioned that the latter in its extreme forward position will form a tight joint with the interior of the combining tube.

Having now described the nature and objects of my invention and the best way now known to me of carrying the same into effect, what I claim herein as new, and desire to secure by Letters Patent, is—

1. A lifting steam tube and combining tube, in combination with a forcing steam tube centrally arranged in said tubes, the outside of said forcing steam tube forming with the bore of the lifting steam tube an annular lifting steam passage and with the inside of the combining tube an annular lifting combining tube and an annular lifting delivery tube, said combining tube being provided with one or more overflow openings in that portion of it which constitutes the exterior wall of the said annular lifting combining tube and annular lifting delivery tube, substantially as described.

2. A lifting steam tube and a combining tube, in combination with a forcing steam tube centrally arranged in said tubes and endwise movable therein, the outside of said movable forcing steam tube forming with the bore of the lifting steam tube a variable annular lifting steam passage and with the inside of the combining tube an annular lifting combining tube and an annular lifting delivery tube, both of variable sections, substantially as and for the purposes specified.

3. An annular lifting steam tube and a central forcing steam tube in combination with a combining tube, forming an annular lifting combining tube and an annular lifting delivery tube as well as a forcing combining tube, substantially as described.

4. An annular lifting steam tube and a central forcing steam tube in combination with a combining tube, provided with overflow openings and forming an annular lifting combining tube and an annular lifting delivery tube as well as a forcing combining tube, substantially as described.

5. An annular lifting steam tube, a central forcing steam tube and a combining tube provided with overflow openings and forming an annular lifting combining tube and an annular lifting delivery tube as well as a forcing combining tube, in combination with an overflow chamber in which said overflow openings are located, substantially as described.

6. In an injector the combination substantially as hereinbefore set forth of a forcing steam nozzle, a lifting steam tube, an annular, lifting combining tube, a forcing combining tube and an annular lifting delivery tube interposed between the forcing combining tube and the lifting combining tube.

7. In an injector the combination substantially as hereinbefore set forth of a forcing steam nozzle, a lifting steam tube, an annular lifting combining tube, a forcing combining tube, a forcing delivery tube and an annular lifting delivery tube interposed between the lifting-combining and forcing-combining tubes.

8. In combination with a lifting steam tube and a forcing steam tube centrally arranged and endwise movable in said lifting steam tube, the main injector steam chamber, a supplementary steam chamber containing the steam inlet ports, of said tubes, and a valve controlling the steam inlet from the main to the supplementary steam chamber, substantially as described.

9. The combination with a lifting steam tube and a forcing steam tube centrally arranged and endwise movable in said lifting tube of the main injector steam chamber, a supplemental steam chamber containing the steam inlet ports of said tubes, a valve controlling the steam admission from the main to the supplemental steam chamber, and a supplemental valve contained in said supplemental chamber for controlling the steam inlet port of the forcing steam tube, substantially as described.

10. The combination of a fixed lifting steam tube, a fixed combining tube, a longitudinally movable forcing steam tube, the outside of this tube forming with the bore of the lifting steam tube a lifting steam passage of annular section and furthermore with the inside of the combining tube a lifting combining tube and a lifting delivery tube both also of annular sections, and a spindle, the forward end of which terminates at a point within said movable tube, which tube is so proportioned and arranged in relation to the fixed tubes and spindle that the central passage in said movable tube and also the annular passages of the aforesaid tubes will be simultaneously altered by the longitudinal movement of said movable tube alone, substantially as described.

11. The combination of a fixed lifting steam tube, a fixed combining tube, a longitudinally movable forcing steam tube, the outside of this tube forming with the bore of the lifting steam tube a lifting steam passage of annular section and furthermore with the inside of the combining tube a lifting combining tube and a lifting delivery tube both also of annular sections, said movable tube being so proportioned and arranged in relation to the fixed tubes that the annular passages of the aforesaid tubes will be simultaneously altered by the longitudinal movement of said movable tube alone, substantially as described.

12. The combination of the injector casing *a* with a set of water tubes comprising the combining tube *i*, forcing delivery tube *j*, check valve box $a^1$ rigidly connected together which set is inserted into the aforesaid casing *a* and held in position by the tail piece and coupling nut belonging to the injector delivery pipe, substantially as described.

In testimony whereof I have hereunto attached my signature in the presence of two witnesses.

FERD. BRUNBAUER.

Witnesses:
DEAN B. MASON,
JOSEF TEHCTUN.